Jan. 15, 1935.  F. J. BERGHOFF  1,988,260
MOVABLE ENCLOSURE
Filed Jan. 2, 1934
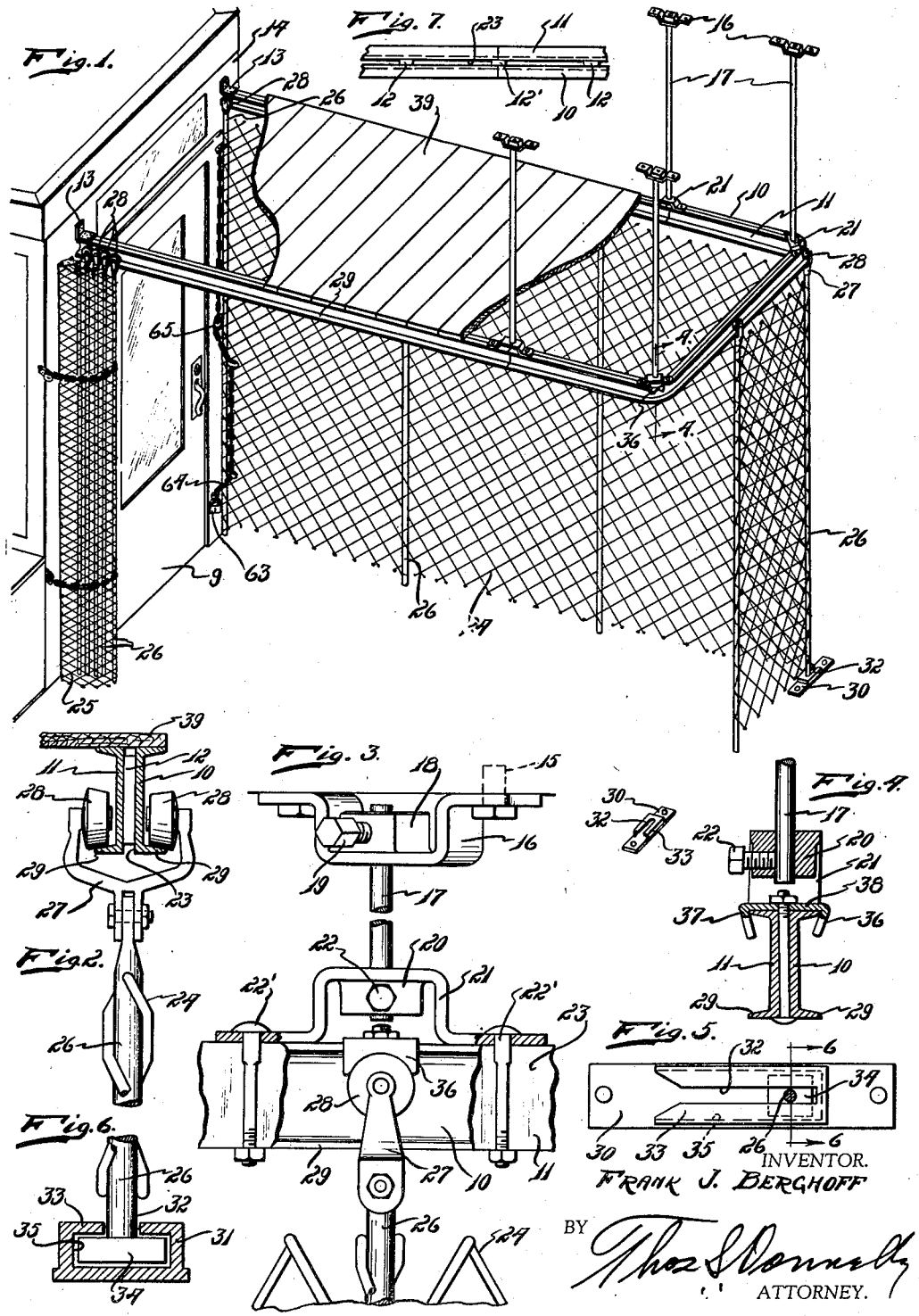

Patented Jan. 15, 1935

1,988,260

UNITED STATES PATENT OFFICE 1,988,260

MOVABLE ENCLOSURE

Frank J. Berghoff, Detroit, Mich.

Application January 2, 1934, Serial No. 704,925

12 Claims. (Cl. 135—5)

My invention relates to a new and useful improvement in an enclosure, adapted for mounting in the interior of buildings, at the door or other entrance, so that when desired, a portion of the interior of the building, accessible through the door or entrance opening, may be partitioned off from the remainder of the interior of the building. The invention is particularly adapted for use in connection with stores and the like, so that a person delivering goods to the store, in the absence of persons within the store, may deposit goods within the building, and yet have no means of access to other goods within the interior proper of the building. While the invention is especially adapted for this use, from the description of the invention, it will be obvious that it is also adapted in connection with other types of enclosures, such as fences or the like, which it may be desirable to move to open or non-enclosing positions at certain times.

It is an object of the present invention to provide a movable enclosure of this class which will be simple in structure, economical of manufacture, durable, highly efficient in use, and easily and quickly moved to enclosing and non-enclosing positions.

It is another object of the present invention to provide a movable enclosure of this class adapted to ride on and be suspended from an overhead track, and so arranged and constructed, that it may be locked in closing position when desired.

Another object of the invention is the provision in a movable enclosure of this type, of an overhead track or trolley, which will serve to support the enclosing members, and be so arranged and constructed that it may easily and simply be mounted in position.

Another object of the invention is the provision, in a device of this class, of an overhead track or trolley, so arranged and constructed that it may be adapted to various shapes, forms and types of installation.

Other objects will appear hereinafter.

The invention consists in the combination and arrangement of parts hereinafter described and claimed.

The invention will be best understood by a reference to the accompanying drawing which forms a part of this specification, and in which, Fig. 1 is a perspective view of the invention with parts broken away.

Fig. 2 is a fragmentary sectional view through one of the tracks.

Fig. 3 is a fragmentary side elevational view of a supporting bracket with parts broken away.

Fig. 4 is a fragmentary sectional view taken on line 4—4 of Fig. 1.

Fig. 5 is a top plan view of a floor plate used in the invention.

Fig. 6 is a sectional view taken on line 6—6 of Fig. 5.

Fig. 7 is a partial plan view of the track forming members.

In Fig. 1 I have illustrated the invention mounted in the interior of a building, so as to project inwardly from the entrance door 9. In the invention I use an overhead track formed from a pair of channel irons 10 and 11, which are spaced apart at intervals by the spacing members 12. These track-forming portions 10 and 11 are welded to the spacers 12, so that a unitary structure is provided. The endmost spacer 12' is formed, at one end of the track sections, of such width, and so located as to project beyond the ends of the portions 10 and 11, so that it may be inserted into the space between the track forming portions of the adjacent track section, thus providing a telescopic arrangement, whereby the sections of the track may be butted together and securely held in position. The ends of the track sections are secured by suitable clips 13 to the wall 14 of building, and these track sections may project outwardly from the wall in any desired direction, so that the construction is adapted for mounting in buildings of various shapes and designs, while at the same time, the track sections are of uniform manufacture, thus permitting of standard production. As shown in Fig. 1, the overhead track is mounted in the form of a frame or endless loop projecting from the wall. Secured to the ceiling or other support of the building by means of the bolts 15, are inverted U-shaped brackets 16, through which may be projected the hanger rods 17. Each of these hanger rods projects through a head or bolt 18, into which is threaded a set screw 19. The lower ends of the hangers 17 project through a boss 20, formed on the bracket 21. A set screw 22 is threaded into boss 20 to engage the rod 17. In this manner, the height of the bracket 21 from the ceiling may be adjusted. This bracket 21 is secured to the track section by means of the bolts 22', which extend through the space 23, between the track forming portions 10 and 11.

In the form illustrated, I have indicated the enclosure formed from a pair of cooperating sections. For the enclosure, I prefer to use the flexible link fence. One section 24, of which is illustrated in Fig. 1 as extended, and the other section 25, of which is indicated as folded into inoperative position. One end of section 25 is permanently secured in position at the wall of the building and the other end is loose. The other section 24 is loose at both ends but is locked, when desired, by the lock 63, the chain 64 and the eyelets 65 in fixed relation to the wall 14, so that when the inner end is covered or hidden by packages placed within the enclosure the authorized person may unlock the lock 63 and move this end of the enclosure to afford entrance to the interior of the building. Vertically extending reinforcing or supporting rods 26 are mounted on the enclosure sections. Mounted on the upper end of each of these rods 26 is a yoke 27, carrying the pair of rollers, pulleys, or trolley wheels 28, each of which engages a flange 29, which projects laterally outwardly from the track forming portions. The construction is such that the enclosure sections 24 and 25 may be easily extended into a closing position or moved to inoperative or non-enclosing position.

Detachably mounted on the floor of the building and preferably in the corners of the frame formed by the track are floor plates 30, each of which is provided with the upwardly projecting head 31, formed hollow and provided with the elongated slot 32 in its upper side 33. One of the rods 26 is provided at its base with the head 34, adapted to enter the cavity 35 in the floor plate head 31, while the rod 26 rides in the slot 32. As shown in Fig. 1, when the sections of the enclosure are moved to operative or enclosing position, the head 34, by riding into the cavity 35, will serve to lock the enclosure against being pressed outwardly at the bottom or raised upwardly. As the head bearing rod rides over the plate 30, the same is elevated, so that the rollers 28 will be forced into the recesses 36, formed in the downwardly projecting lugs 37, which are carried by the plate 38, mounted on the upper surface of the track at proper locations. The engagement of the rollers in these recesses 36, serves further to render rigid the enclosure when moved to operative position, and prevent any undue tampering or pressing outwardly of the same from the track itself.

When the enclosed sections 24 and 25 are moved to operative or enclosing position, their free ends will move into engagement with each other, and these free ends may may be suitably locked or secured together, so that they cannot be slid into inoperative or non-enclosing position until they have been unlocked or unsecured.

In order to prevent access to the interior of the building, over the frame, a roofing 39 is mounted on the track, a portion of this roofing 39 being broken away in Fig. 1.

In a construction mounted in this manner, it is obvious that the enclosing sections may be easily and quickly moved to operative position. It is also believed obvious that a light and durable structure is thus provided, which while assuring a maximum protection, may be easily and quickly mounted in position in various types of locations. It will be noted that the corner supports 17 form with the roller bearing rods 26 a continuous support from the ceiling to the floor.

While I have illustrated and described the preferred form of construction, I do not wish to limit myself to the precise details of structure shown, but desire to avail myself of such variations and modifications as come within the scope of the appended claims.

Having thus described my invention of what I claim is new and desire to secure by Letters Patent is:

1. A movable enclosure of the class described comprising an overhead track; a flexible enclosure; trolley wheels carried by and projecting above said enclosure and engaging said track; a reinforcing rod on said enclosure; a head carried on the lower end of said rod; and a locking shoe positioned on a support below said enclosure, and having a slot for reception, in locking engagement, of said head.

2. A movable enclosure of the class described comprising an overhead track; a flexible enclosure; reinforcing rods on said flexible enclosure; a flange on opposite sides of said track; a pair of pulleys carried by said rods and projecting upwardly from said enclosure, and riding on said flanges.

3. A movable enclosure of the class described comprising an overhead track; a flexible enclosure; a plurality of reinforcing rods on said enclosure in spaced relation to each other; a flange projecting laterally from each side of said track; a pair of spaced pulleys carried by and projecting upwardly from said rods, each of said pulleys being adapted for riding on one of said flanges.

4. A movable enclosure of the class described comprising an overhead track; trolley wheels riding on said track; a flexible enclosure suspended from said trolley wheels; a locking member for engaging and locking the end of said enclosure; and means on said track for engaging and locking one of said pulleys upon the locking of said end of said enclosure.

5. In a movable enclosure of the class described, an overhead track comprising a pair of elongated, parallel, spaced track forming members; spaced spacing members positioned between said track forming members, said track forming members and said spacing members being permanently connected together; a supporting bracket; and a rod projecting through the space between said track forming members and connecting at its upper end to said bracket.

6. In a movable enclosure of the class described an overhead track comprising a pair of elongated, spaced, parallel track forming members; a lurality of spaced members positioned between said track forming members, said track forming members and said spacing members being permanently connected together; a supporting bracket for said track; and supporting means projecting through the space between said track forming members and connecting to said bracket.

7. In a movable enclosure of the class described an overhead track comprising a pair of elongated, spaced, parallel track forming members; a plurality of spaced spacing members positioned between said track forming members, said track forming members and said spacing members being permanently connected together; a supporting bracket for said track; and supporting means projecting through the space between said track forming members and connecting to said bracket; and adjustable means for supporting said bracket.

8. For use with a supporting body having an opening therein provided with a closure therefor, an elevated track projecting outwardly from said supporting body at opposite sides of said opening; a flexible enclosure slidable along and depending downwardly from said track and slidable into position for defining and enclosing a space outwardly from said supporting body accessible through said opening; and a covering mounted on said track for providing a top for said space so enclosed.

9. For use with a building wall having an opening formed therein provided with a closure therefore, an elevated track projecting outwardly from said wall at opposite sides of said opening; a flexible closure slidable along and depending from said track and movable into position for determining and enclosing a space outwardly from said wall and accessible through said opening, said flexible enclosure reaching to the floor of said building.

10. For use with a building wall having an opening formed therein provided with a closure therefore, an elevated track projecting outwardly from said wall at opposite sides of said opening; a flexible closure slidable along and depending from said track and movable into position for determining and enclosing a space outwardly from said wall and accessible through said opening, said flexible enclosure reaching to the floor of said building; and a top mounted on said track for covering said space.

11. For use with a building having a ceiling and a wall provided with an elevated track projecting inwardly of the building from said wall at opposite sides of the door; supporting means depending from the ceiling for supporting said track; a flexible closure slidable on and depending from said track to the floor of said building and slidable to position for enclosing a space in said building accessible through said door.

12. For use with a building having a ceiling and a wall provided with a door, an elevated track projecting inwardly of the building from said wall at opposite sides of the door; supporting means depending from the ceiling for supporting said track; a flexible closure slidable on and depending from said track to the floor of said building and slidable to position for enclosing a space in said building accessible through said door; and a cover mounted on said track for forming a top for said space.

FRANK J. BERGHOFF.